United States Patent
Ohta et al.

[11] Patent Number: 6,001,467
[45] Date of Patent: Dec. 14, 1999

[54] MAGNETO-OPTIC MEMORY MEDIUM

[75] Inventors: Kenji Ohta, Nara-ken; Akira Takahashi, Nara; Yoshiteru Murakami, Nishinomiya; Junichiro Nakayama, Nara-ken; Tomoyuki Miyake, Tenri, all of Japan

[73] Assignee: Sharp Kabushiki Kaisha, Osaka, Japan

[21] Appl. No.: 08/013,987

[22] Filed: Feb. 5, 1993

Related U.S. Application Data

[63] Continuation of application No. 07/715,738, Jun. 18, 1991, abandoned, which is a continuation of application No. 07/275,724, Nov. 23, 1988, abandoned.

[30] Foreign Application Priority Data

Nov. 26, 1987 [JP] Japan .................................. 62-300646

[51] Int. Cl.$^6$ ........................................................ G11B 5/66
[52] U.S. Cl. .................. 428/332; 428/336; 428/694 ML; 428/694 SC; 428/694 DE; 428/694 RE; 428/694 NF; 428/694 RL; 428/900; 369/13; 369/14; 365/122; 360/131; 360/135
[58] Field of Search ..................... 428/900, 332, 428/336, 694 ML, 694 SC, 694 DE, 694 RE, 694 NF, 694 RL

[56] References Cited

U.S. PATENT DOCUMENTS

| | | | |
|---|---|---|---|
| 4,467,383 | 11/1984 | Ohta et al. .............................. | 360/131 |
| 4,610,912 | 9/1986 | Takahashi et al. ...................... | 360/131 |
| 4,693,943 | 9/1987 | Kishi et al. .............................. | 428/330 |
| 4,751,142 | 6/1988 | Arimune et al. ......................... | 428/692 |
| 4,814,238 | 3/1989 | Tanaka et al. ........................... | 428/678 |
| 4,833,048 | 5/1989 | Gardner ................................... | 428/213 |
| 4,880,694 | 11/1989 | Takayama et al. ............... | 428/694 NL |

FOREIGN PATENT DOCUMENTS

| | | |
|---|---|---|
| 267948 | 11/1987 | Japan . |
| 2071696 | 9/1981 | United Kingdom . |

OTHER PUBLICATIONS

Imamura, N. et al "MO Recording on Amorphous Films", IEEE Trans. Mag–, vol.–Mag 21, No. 5–, Sep. 1985 pp. 1607–1612.

Deguchi et al "Digital magnetooptic disk drive," Applied Optics, vol. 23, No. 22, Nov. 15, 1984, pp. 3972–3978.

Imamura, N. et al "Magneto–opotical Recording on Amorphous Films, " IEEE Trans. on Mag., vol–Mag 21, No. 5, Sep. 1985, pp. 1607–1612.

*Primary Examiner*—Leszek Kiliman

[57] ABSTRACT

A magneto-optic memory medium comprising a dielectric film, a magneto-optic memory film, a dielectric film and a reflective film superposed in layers on a light trnasmitting substrate, the magneto-optic memory film being a rare earth-transition metal alloy film having the composition formula of:

$$(Gd_xTb_{1-x})_yFe_{1-y}$$

wherein x is 0.58 to 0.62, and y is 0.27 to 0.33, which is useful as a magneto-optic disc or magneto-optic card.

13 Claims, 3 Drawing Sheets

MAGNETO-OPTIC MEMORY MEDIUM

This application is a continuation of application Ser. No. 07/715,738 filed on Jun. 18, 1991, which is a continuation of application Ser. No. 07/275,724 filed on Nov. 23, 1988, both now abandoned.

BACKGROUND OF THE INVENTION

1. Field of the Invention

The present invention relates to magneto-optic memory media, and more particularly to a memory medium for use in memory devices, such as magneto-optic discs and magneto-optic cards, utilizing a magneto-optic effect.

2. Description of the Prior Art

Active research has been carried out on thin films of amorphous alloys comprising a rare-earth element and a transition metal for use as magneto-optic memory media. Among these, thin films of GdTbFe alloy composed of gadolinium and terbium as rare-earth elements and iron as a transition metal are in the range of 150 to 200° C. in Curie temperature and have a suitable recording sensitivity for use as magneto-optic recording media with a semiconductor laser for recording, reproducing or erasing data.

However, the GdTbFe alloy usually has a small Kerr rotation angle of about 0.3 and therefore has the drawback of being unsatisfactory in the quality of signals reproduced. Accordingly, we have proposed a method of giving an increased Kerr rotation angle by using a dielectric film and a reflective film, i.e., by forming a dielectric film, GdTbFe film, dielectric film and reflective film in this order (see, for example, Applied Optics, Vol. 23, No. 22, p. 3927). With this four-layer film structure, the GdTbFe alloy film is made to have a reduced thickness of 10 nm to 50 nm to utilize both the Kerr effect and the Faraday effect. The Kerr rotation angle can then be increased easily threefold to fivefold to reproduce signals with an improved quality.

Nevertheless, the composition of the GdTbFe alloy is a further important factor in providing magneto-optic memory media of four-layer film structure which are satisfactorily usable in respect of the quality of reproduced signals, uniformity of size of recording bits and stabilized record retentivity.

The rare earth-transition metal alloy films for use as megneto-optic memory media are generally ferrimagnetic materials wherein the spins of the rare earth and the transition metal are in an antiparallel arrangement and which have a compensation point composition when the proportion of rare earth atoms is about 25 atomic %. FIG. 4 shows the relationship between the coercive force Hc of such films and the rare earth proportion thereof. The variation rate of the coercive force is smaller in compositions (RE-rich compositions) containing a larger amount of rare-earth atoms (RE) than the compensation point than in compositions (TM-rich compositions) containing a larger amount of transition metal atoms than the compensation point.

The coercive force, like the Curie temperature, is an important parameter influencing the recording sensitivity of magneto-optic memory media. The coercive force, when different at room temperature, also differs at the recording temperature as shown in FIG. 5, such that even if the medium is externally given the same recording magnetic field, data can be recorded at some portions but can not be recorded at other portions. In other words, if a memory medium varies in coercive force distribution along the plane thereof and is irradiated with a laser beam under the same condition for recording, the size (width) of bits recorded differs from portion to portion. Thus, the variation in the coercive force distribution is a primary cause of the degradation of reproduced signals. Variations in the coercive force distribution in the medium are mainly due to irregularities in the alloy composition of the medium and are therefore difficult to obviate.

Accordingly, in order to make the bit width uniform to the greatest possible extent and thereby preclude the degradation of reproduced signals, there arises a need to select a region of composition (e.g., the RE-rich composition region of FIG. 4) wherein the variation rate of coercive force is small relative to variations in composition.

The rare earth-transition metal alloy film for use as a magneto-optic medium must to have an axis of easy magnetization perpendicular to the plane of the film. When the coercive force is small, an intraplanar component of the axis occurs so as to make the recording bits unstable and impair the quality of reproduced signals. It is therefore desired that the GdTbFe alloy have a composition at least about 1000 oersteds in coercive force.

It is also known that with rare earth-transition metal alloy films, the Kerr effect and the Faraday effect at room temperature increase as the Curie temperature rises, giving reproduced signals of higher quality.

The foregoing indicates that magneto-optic memory media, in order to be useful, must have such a composition as to give signals of satisfactory quality.

In this connection, Laid-Open Dutch Patent Specification No. 7,713,503, FIG. 2 discloses a magnetic material which comprises an Fe-rich GdTbFe alloy represented by the formula $(Gd_xTb_{1-x})_yFe_{1-y}$ wherein x is 0.65, and y is 0.23.

On the other hand, Examined Japanese Patent Publication SHO 60-32331 discloses a magneto-optic recording medium which comprises an Fe-rich GdTbFe alloy thin film represented by the above formula wherein x is 0.37, 0.50 or 0.81, and y is 0.27, 0.26 or 0.21.

The GdTbFe alloy films specifically disclosed in these publications afford reproduced signals which are satisfactory to some extent in quality when incorporated into magneto-optic memory media of the foregoing four-layer film structure. However, a further improvement in the quality of reproduced signals is desirable in avoiding reading errors and assuring reading at a higher speed.

SUMMARY OF THE INVENTION

From this viewpoint, we have conducted intensive research and found that the magneto-optic memory medium of four-layer film structure can be adapted for the reproduction of signals therefrom with a remarkably improved quality by incorporating therein an alloy of the above formula wherein the value of x defining the composition ratio between Gd and Tb is controlled to the range of 0.58 to 0.62 which is in no way specifically disclosed in either of the two publications.

Thus, the present invention provides a magneto-optic memory medium comprising a dielectric film, a magneto-optic memory film, a dielectric film and a reflective film superposed in layers on a light transmitting substrate, the magneto-optic memory film being a rare earth-transition metal alloy film having the composition formula of:

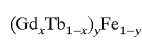

$(Gd_xTb_{1-x})_yFe_{1-y}$ wherein x is 0.58 to 0.62, and y is 0.27 to 0.33.

The magneto-optic memory medium of the present invention is adapted for the reproduction of signals therefrom with an excellent quality, especially with a higher C/N ratio (carrier to noise ratio) than in the prior art. The present medium is also satisfactory in the uniformity of recording bit width and in stabilized record retentivity, therefore has improved recording reliability and is very useful.

DESCRIPTION OF THE PREFERRED EMBODIMENT

The magneto-optic memory medium of the present invention comprises a four-layer structure which is composed of a dielectric film, magneto-optic memory film, dielectric film and reflective film as superposed in this order and which is formed on a light transmitting substrate, for example, of glass or plastics (e.g. polycarbonate). The medium is not limited specifically in its shape as seen from above and can be, for example, in the form of a disc (magneto-optic disc) or a rectangle (magneto-optic card).

It is suitable that each of the dielectric films of the present medium be a metal nitride film, such as silicon nitride, aluminum nitride, silicon-aluminum-nitride or like film. The metal nitride film may be doped with an element, such as yttrium, oxygen or carbon, to give a higher dielectric constant. Such a dielectric film can be formed by a known process such as CVD, sputtering or reactive vapour deposition. The dielectric film is formed on the light transmitting substrate and also on the magneto-optic memory film. It is suitable that the thickness of the dielectric film be 50 to 100 nm on the substrate or 10 to 100 nm on the memory film.

The magneto-optic memory film of the invention is made of a rare earth-transition metal alloy represented by the formula:

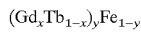

$(Gd_xTb_{1-x})_yFe_{1-y}$ wherein x is 0.58 to 0.62, and y is 0.27 to 0.33. If x is outside the above range, signals can not be obtained with a high quality, especially a high C/N ratio, as contemplated. When y is outside the above range, degradation of signals will occur owing to unevenness of recording bit width. Thus, x and y values outside the respective ranges are not suitable. More preferably, x is 0.60 to 0.62 and y is 0.27 to 0.29 from the viewpoint of signal quality.

The magneto-optic memory film can be formed over the dielectric film on the substrate by a known process such as CVD, sputtering or vacuum deposition. Suitably, the memory film has a thickness of 5 to 100 nm. The memory film may be doped with a small amount of atoms of corrosion-resistant metal such as Cr, Ti, Al, Ta or Ni to prevent corrosion due to moisture.

The reflective film of the present medium is a metal film capable of reflecting ligh efficiently and having high corrosion resistance, such as a film of aluminum, nickel, titanium, gold, silver, tellurium, stainless steel or like metal. The reflective film may be made of an alloy such as aluminum-nickel alloy or aluminum-titanium alloy. It is especially desirable to use aluminum or aluminum alloy for the film. The reflective film can be formed by a known process such as CVD, sputtering or vacuum deposition and is suitably 10 to 300 nm in thickness.

EXAMPLES

Figure 1:
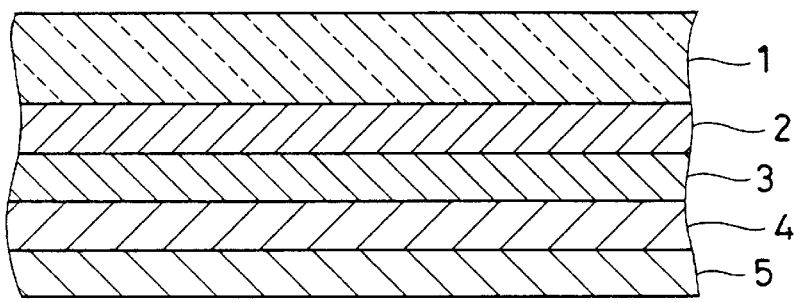
FIG. 1 is an enlarged fragmentary view in section showing the basic structure of a magneto-optic disc embodying the present invention.

FIG. 1 is an enlarged fragmentary view in section showing the basic structure of a magneto-optic disc embodying the invention. As illustrated, the disc comprises a circular glass substrate 1 having a diameter of 13 φ mm, and an AlN film 2 (80 nm) serving as a dielectric film, $(Gd_xTb_{1-x})_yFe_{1-y}$ film 3 (25 nm) as a magneto-optic memory film, AlN film 4 (25 nm) and Al film 5 (50 nm) as a reflective film which are formed in superposed layers on the substrate 1.

Figure 2:
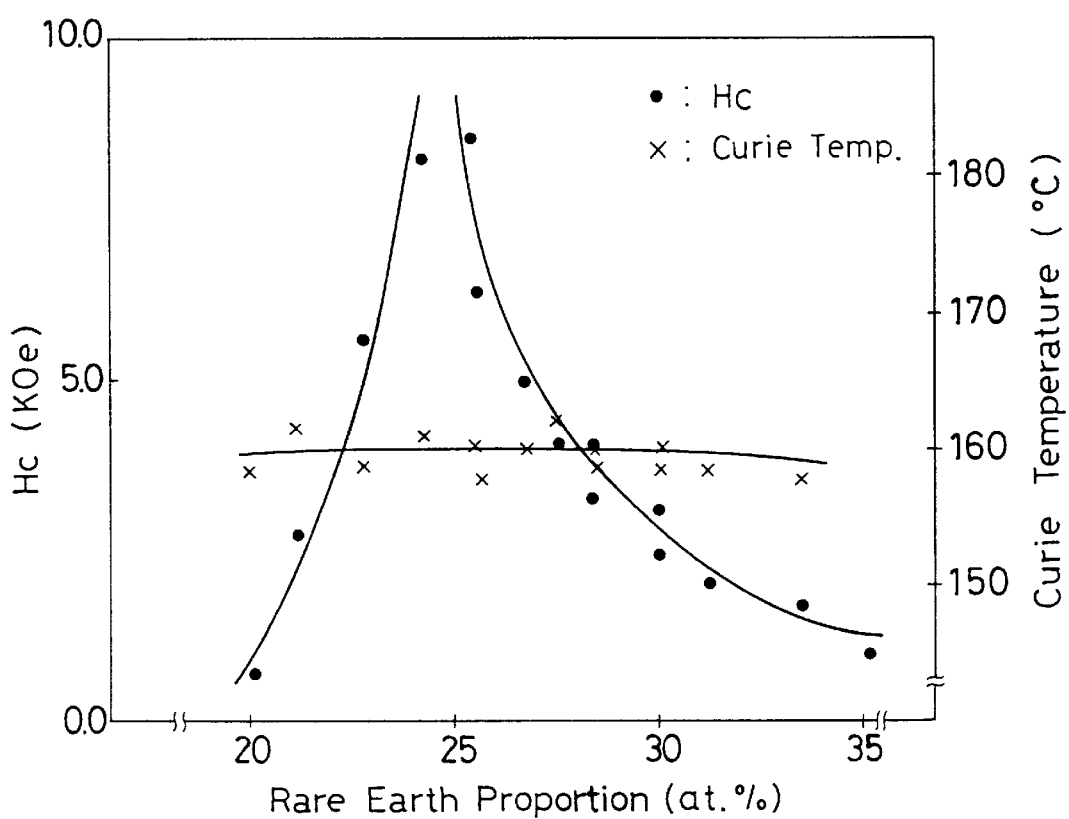
FIG. 2 is a graph showing the dependence of the coercive force and Curie temperature of GdTbFe alloy on the rare earth proportion.

Magneto-optic discs were prepared which had the same structure as above and in which the magneto-optic memory film was formed with the x value in $(Gd_xTb_{1-x})_yF_{1-y}$ fixed to 0.5 (Gd:Tb=1:1) and with varying values used for y. The coercive force and the Curie temperature of the discs were measured with the results given in FIG. 2. The drawing indicates that the coercive force is at least 1000 oersteds when the rare earth proportion is 20 to 35% (y=0.20–0.35) and varies at a small rate in the RE-rich region. The drawing further reveals that the Curie temperature is substantially not dependent on the Fe proportion. This relationship remains almost unchanged even when the Gd:Tb ratio varies, especially when x is not smaller than 0.58. Accordingly, these results first indicate that the compositions wherein y is 0.27 to 0.33 are required for the reproduction of signals of high quality.

Figure 3:
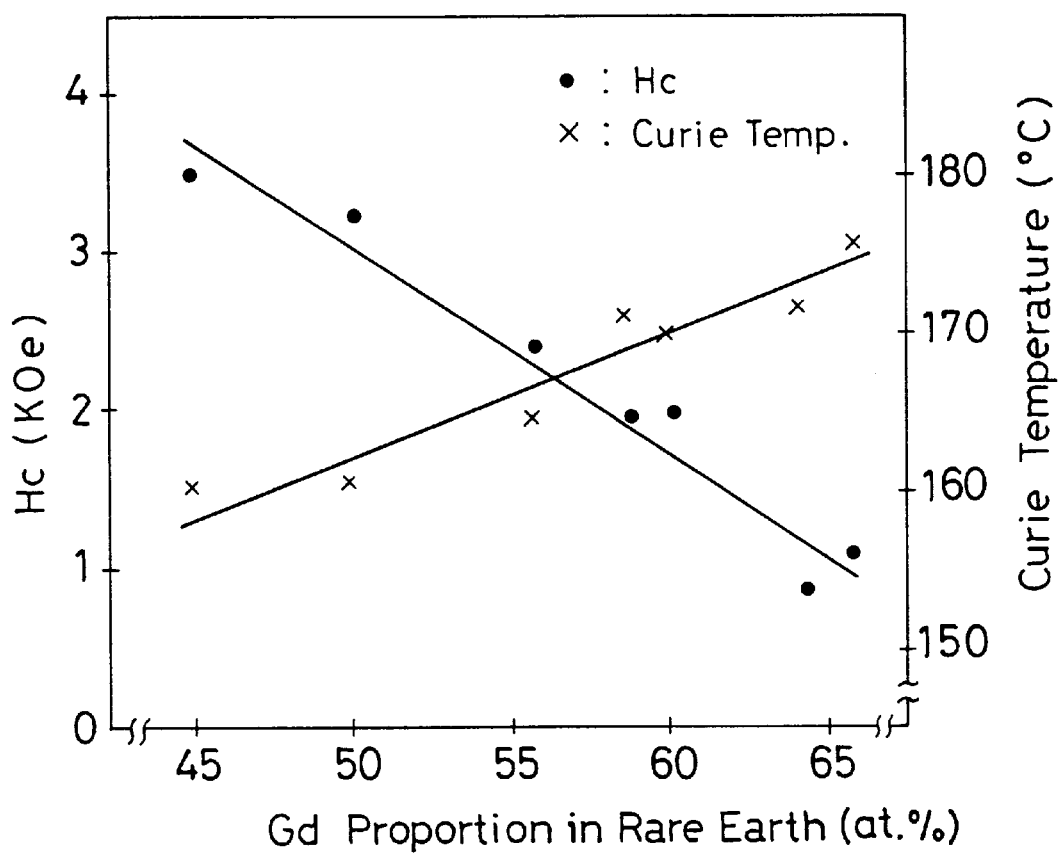
FIG. 3 is a graph showing the dependence of the coercive force and Curie temperature of GdTbFe alloy on the Gd proportion.
Figure 4:
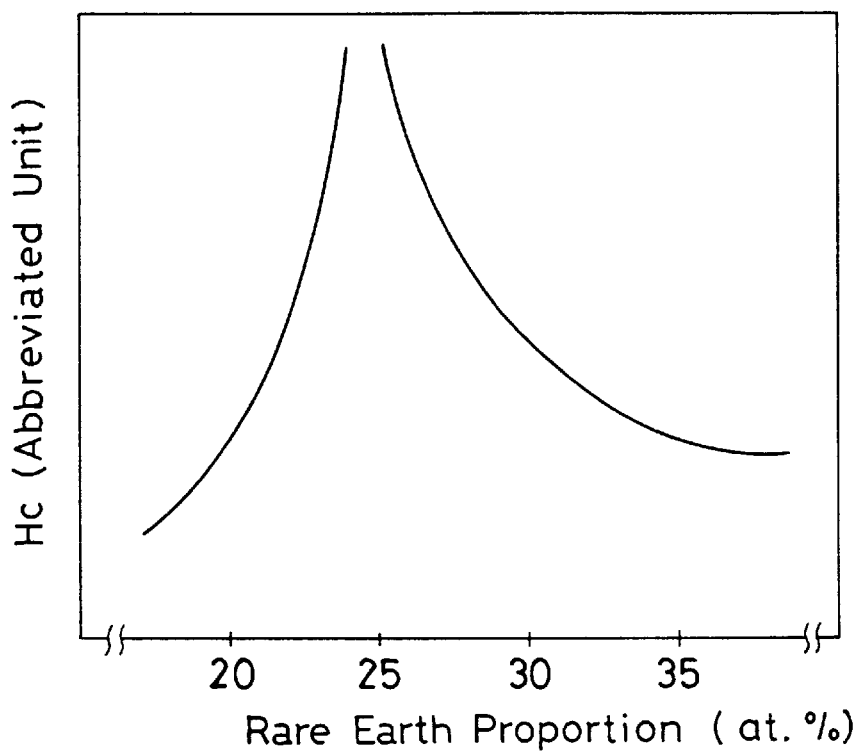
FIG. 4 is a graph showing the dependence of the coercive force of a common rare earth-transition metal alloy film on the composition thereof.
Figure 5:
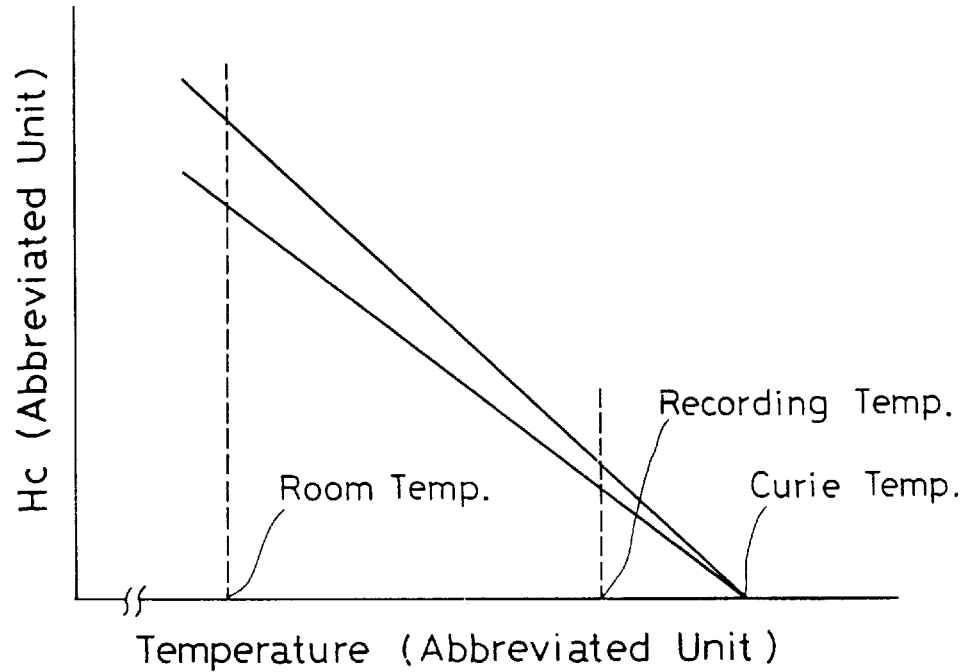
FIG. 5 is a model diagram for illustrating the influence of difference in coercive force at room temperature on the magneto-optic recording sensitivity.

Next, the ratio between Gd and Tb was varied with the Fe proportion fixed to about 72% (y=0.28) to measure the coercive force and the Curie temperature as seen in FIG. 3. The diagram shows that the Curie temperature rises with a decrease in the coercive force as the Gd proportion increases. Accordingly, it is further required that the Gd to Tb ratio be properly determined, in order to obtain magneto-optic memory media for giving signals of high quality.

In this connection, magneto-optic discs having the structure of FIG. 1 were preparing using GdTbFe films having different compositions wherein x was varied with y fixed to 0.27 to 0.29. The AlN film, Al film and GdTbFe film were all prepared by sputtering. The x and y values adjusted by controlling the composition of the target.

Table 1 below shows the measurements of C/N ratio obtained by testing the discs for reproduction. Thus, signals of exceedingly high quality were obtained when x was in the range of 0.58 to 0.62. Table 2 below shows the test conditions. Depending on the recording power and recording magnetic field, the signal quality listed in Table 1 somewhat varies but remains unchanged in tendency.

TABLE 1

| | x | y | C/N (dB) |
|---|---|---|---|
| 1 | 0.44 | 0.28 | 46.2 |
| 2 | 0.50 | 0.28 | 47.3 |
| 3 | 0.56 | 0.27 | 48.4 |
| 4 | 0.58 | 0.28 | 50.8 |
| 5 | 0.60 | 0.29 | 51.5 |
| 6 | 0.62 | 0.27 | 51.8 |
| 7 | 0.65 | 0.28 | 48.5 |

TABLE 2

| | |
|---|---|
| Recording wavelength | 780 nm |
| Objective lens NA | 0.6 |
| Recording power (medium surface) | 8 mW |
| Reproduction power (medium surface) | 1 mW |
| Recording magnetic field | 300 Oe |
| Linear speed | 22 m/s |
| Recording frequency | 15 MHz |

Common magnetic disc drives for computers have a standardized rotational speed of 3600 r.p.m. When such a disc drive is to be used as it is for magneto-optic discs, the discs must be adapted for satisfactory recording and reproduction at 3600 r.p.m. On the other hand, it is desired that magneto-optic discs be about $5 \times 10^7/\text{cm}^2$ (bit diameter 1 $\mu$m) in bit density. When to be satisfactorily usable for reproduction at this bit density at the above speed (3600 r.p.m.), the disc must be at least 50 dB in C/N ratio.

As seen in Table 1, the magneto-optic disc of the present invention achieves a C/N ratio exceeding 50 dB. Accordingly, the common magnetic disc drive is usable as it is for driving the present disc. The disc of the invention, which is adapted for reproduction of signals with a high quality, therefore also has very great technical advantages.

Incidentally, the coercive force is dependent also on the film thickness. The coercive force increases with decreasing film thickness but conversely decreases with increasing film thickness, so that there is a need to control the composition according to the thickness. However, the variations in the coercive force were small when the thickness was about 20 to about 50 nm.

With the magneto-optic memory medium of four-layer film structure, it is most desirable that the magneto-optic memory film be 0.58 to 0.62 in the value of x and about 20 to about 50 nm in thickness.

What we claimed is:

1. A magneto-optic memory medium consisting essentially of: a first dielectric film, a magneto-optic memory film, a second dielectric film and a reflective film, wherein said films are superposed in layers on a light transmitting substrate, the magneto-optic memory film being a rare earth-transition metal alloy film having the composition formula:

$$(Gd_xTb_{1-x})_yFe_{1-y}$$

wherein x is 0.58 to 0.62, and y is 0.27 to 0.33, and wherein said magneto-optic memory film has a thickness of 20–50 nm.

2. A magneto-optic memory medium comprising:

a first dielectric film, a magneto-optic memory film, a second dielectric film and a reflective film, wherein said films are superposed in layers on a light transmitting substrate, the magneto-optic memory film being a rare earth-transition metal alloy film having the composition formula:

$$(Gd_xTb_{1-x})_yFe_{1-y}$$

wherein x is 0.58 to 0.62, and y is 0.27 to 0.33, and in which the rare earth-transition metal alloy film has a thickness of 5–100 nm.

3. The magneto-optic memory medium of claim 1 in which the rare earth-transition metal alloy film of the formula wherein x is 0.60 to 0.62 and y is 0.27 to 0.29 is used.

4. The magneto-optic memory medium of claim 1 in which each of the dielectric films is made of a metal nitride.

5. The magneto-optic memory medium of claim 4 in which the metal nitride is silicon nitride, aluminum nitride or silicon-aluminum nitride.

6. The magneto-optic memory medium of claim 1 in which the reflective film is made of aluminum, nickel, titanium, gold, silicon, tellurium or stainless steel.

7. The magneto-optic memory medium of claim 1 in which the light transmitting substrate is made of glass or plastic.

8. The magneto-optic memory medium of claim 1 in the form of a magneto-optic disc or a magneto-optic card.

9. The magneto-optic memory medium of claim 3 in which each of the dielectric films is made of a metal nitride selected from the group consisting of silicon nitride, aluminum nitride and silicon-aluminum nitride.

10. The magneto-optic memory medium of claim 9 in which the reflective film is made of aluminum, nickel, titanium, gold, silicon, tellurium or stainless steel.

11. The magneto-optic memory medium of claim 10 in which the light transmitting substrate is made of glass or plastic.

12. The magneto-optic memory medium of claim 1 in which said first dielectric film has a thickness of 50 to 100 nm and said second dielectric film has a thickness of 10 to 100 nm.

13. The magneto-optic memory medium of claim 1 in which said reflective film has a thickness of 10 to 300 nm.

* * * * *